(12) United States Patent
Majerowicz (10) Patent No.: US 12,314,241 B1
(45) Date of Patent: May 27, 2025

(54) SYSTEM, METHOD, AND COMPUTER PROGRAM FOR OPTIMISTIC CONCURRENCY CONTROL MECHANISM WITH AUTOMATIC CONTENT MERGE

(71) Applicant: Amdocs Development Limited, Limassol (CY)

(72) Inventor: Lucas Dario Majerowicz, Herzlyia (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 58 days.

(21) Appl. No.: 18/215,708

(22) Filed: Jun. 28, 2023

(51) Int. Cl.
*G06F 16/23* (2019.01)
*G06F 16/242* (2019.01)

(52) U.S. Cl.
CPC ........ *G06F 16/2329* (2019.01); *G06F 16/244* (2019.01)

(58) Field of Classification Search
CPC .. G06F 16/27; G06F 11/2048; G06F 11/2097; G06F 16/273; G06F 16/2308; G06F 16/2315; G06F 16/275; G06F 16/23; G06F 16/13; G06F 16/2365; G06F 16/2456; G06F 16/285; G06F 16/2329; G06F 16/244
See application file for complete search history.

(56) References Cited

U.S. PATENT DOCUMENTS

| | | | | |
|---|---|---|---|---|
| 9,569,070 B1* | 2/2017 | Ma | ........................ | G06F 16/273 |
| 9,792,161 B2* | 10/2017 | Huang | ................. | G06F 11/008 |
| 2005/0065945 A1* | 3/2005 | Heusermann | ......... | G06F 16/221 |
| 2016/0147640 A1* | 5/2016 | Huang | ................. | G06F 11/008 |
| | | | | 717/130 |
| 2016/0357791 A1* | 12/2016 | Levandoski | .............. | G06F 9/46 |
| 2018/0046565 A1* | 2/2018 | Lu | ....................... | G06F 11/3636 |
| 2019/0057173 A1* | 2/2019 | Ventroux | ............... | G06F 30/33 |
| 2019/0340168 A1* | 11/2019 | Raman | .................... | G06F 16/27 |

* cited by examiner

*Primary Examiner* — Ajay M Bhatia
*Assistant Examiner* — Berhanu Mitiku
(74) *Attorney, Agent, or Firm* — Zilka-Kotab, P.C.

(57) ABSTRACT

As described herein, a system, method, and computer program provide automatic content merging for an optimistic concurrency control mechanism. A concurrency error resulting from a first source requesting a first update to a resource concurrently with a second source requesting a second update to the resource is detected. Responsive to detecting the concurrency error, the first update and the second update are merged to form a merged update. The merged update is saved to the resource.

6 Claims, 5 Drawing Sheets

SYSTEM, METHOD, AND COMPUTER PROGRAM FOR OPTIMISTIC CONCURRENCY CONTROL MECHANISM WITH AUTOMATIC CONTENT MERGE

FIELD OF THE INVENTION

The present invention relates to optimistic concurrency control mechanisms.

BACKGROUND

In computer processing systems where multiple independently-running application programming interface (API) clients (e.g. threads) are capable of modifying a same resource at approximately the same time (e.g. concurrently), some concurrency control is required. For example, in this scenario, each client will typically fetch the sane resource (using a fetch API), modify the resource in some way, and then save the modified resource (using a save API). If no precautions are taken, the second client to update the resource can end up overriding the changes made by the first client.

One existing concurrency control that is provided as a solution to the scenario described above is an optimistic concurrency control, also known as optimistic locking. This is concurrency control method applied to transactional systems such as relational database management systems and software transactional memory. Optimistic concurrency control, such as a Hypertext Transfer Protocol (HTTP) optimistic concurrency control, is configured to prevent an update request from overriding previous changes. In particular, the fetch API will generally include an entity tag (Etag) header, or other version identifier header, in the response, where the Etag value changes each time the resource contents change. When calling the update API (e.g. PUT), the client will pass the Etag value back to the service on a new request header called If-Match, and the server, when processing the update request, can compare the received Etag value against the current one. In case the values don't match, the update request will be rejected.

However, this existing optimistic concurrency control is limited. In particular, the standard optimistic concurrency control is only meant to prevent updates that might override previous changes, which is accomplished by merely rejecting an update request for a given client. In turn, the client must then re-try the entire fetch-update cycle. This causes additional computing resources to be consumed.

There is thus a need for addressing these and/or other issues associated with the prior art. For example, there is a need to provide automatic content merging for a optimistic concurrency control mechanism.

SUMMARY

As described herein, a system, method, and computer program provide automatic content merging for an optimistic concurrency control mechanism. A concurrency error resulting from a first source requesting a first update to a resource concurrently with a second source requesting a second update to the resource is detected. Responsive to detecting the concurrency error, the first update and the second update are merged to form a merged update. The merged update is saved to the resource.

DETAILED DESCRIPTION

Figure 1:
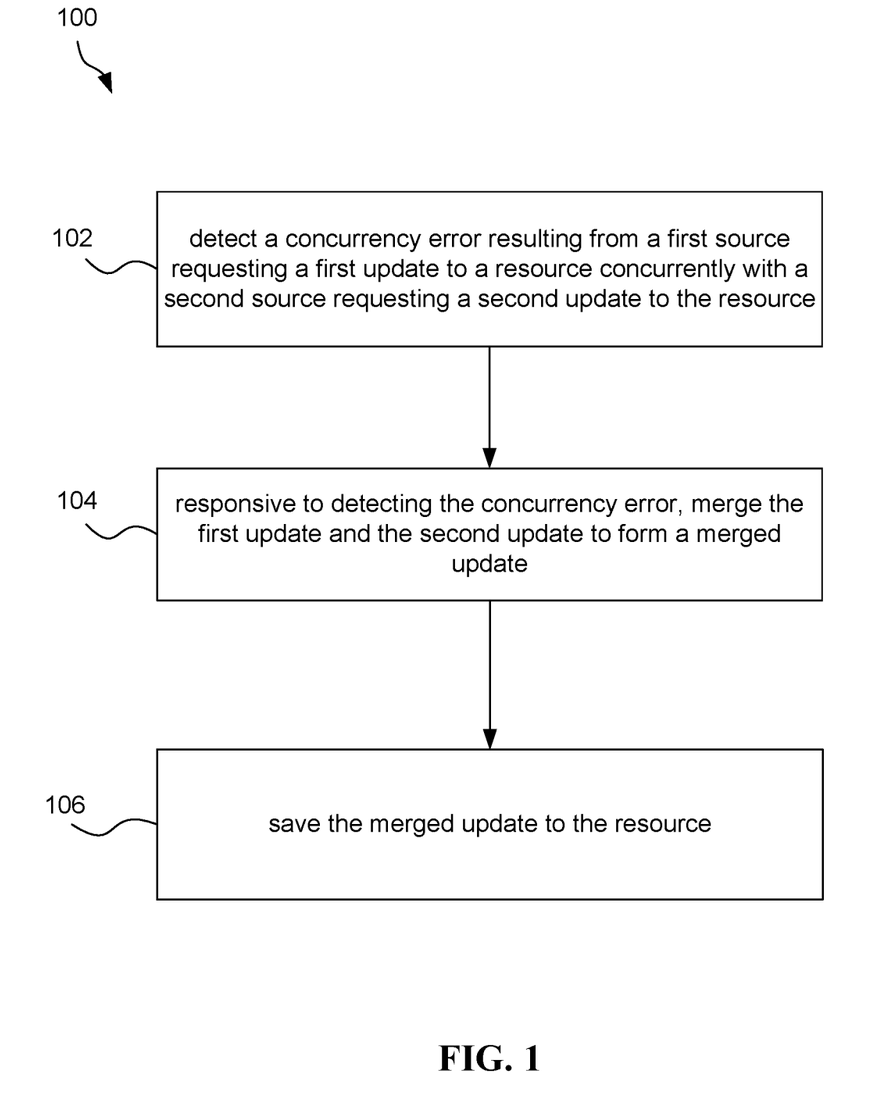
FIG. 1 illustrates a method for automatic content merging for an optimistic concurrency control mechanism, in accordance with one embodiment.

FIG. 1 illustrates a method 100 for automatic content merging for an optimistic concurrency control mechanism, in accordance with one embodiment. The method 100 may be carried out by a computer system, such as that described below with respect to FIGS. 4 and/or 5. In an embodiment, the computer system may store one or more resources requiring concurrency control.

In the context of the present description, the optimistic concurrency control mechanism refers to a method, policy, process, etc. that is configured to control concurrent updates (i.e. by independent sources) to a resource. In the present embodiment, a resource refers to data capable of being fetched (e.g. read) from a data structure or any location in memory. In an embodiment, the resource may be a row in a table of a database, for example. In an embodiment, the resource may include one or more values representing the data, such as values in fields of the row of the table mentioned above.

A concurrent update refers to at least two updates from independent sources on a same version of the resource. The updates include modifications to the resource. Typical optimistic concurrency control mechanisms will address concurrent updates by failing, and returning an error for, one of the updates from one of the independent sources. As described herein, the optimistic concurrency control mechanism is adapted to include automatic content merging in the case of concurrent updates, which in at least some cases allows the concurrent updates from independent sources to be merged and saved to the resource.

In operation 102, a concurrency error resulting from a first source requesting a first update to a resource concurrently with a second source requesting a second update to the resource is detected. The first source and the second source refer to independent sources, such as processes, threads, applications, etc. independently running in one or more computer systems. In the context of the present description, the first source and the second source are each configured to issue respective requests to update a resource.

The concurrency error is detected when the first update and the second update are concurrent updates. In an embodiment, the concurrency error is detected when the first source and the second source fetch a same version of the resource and both request to update the same version of the resource. In this case, the second update will override the first update in case both the first update and the second update are saved to the resource.

In an embodiment, a version of the resource may be updated each time the resource is updated. For example, the version of the resource may be incremented each time the resource is updated. As mentioned above, in the present embodiment the first source and the second source may fetch a same version of the resource (i.e. for independently updating the same).

Further to this embodiment where the first source and the second source may fetch a same version of the resource, the concurrency error may be detected when the version of the resource fetched by the second source for updating does not match a current version of the resource at a time that the second update to the resource is requested. In this context, the current version of the resource may not match the version of the resource fetched by the second source as a result of the first update being made to the resource by the first source before the time that the second update to the resource is requested.

In an embodiment, the resource fetched by the first source and the second source may be tagged with an indicator of the version of the resource. In this embodiment, the first update and the second update may also be tagged with the indicator of the version of the resource for use in detecting the concurrency error. When a requested update is tagged with a version that does match a current version of the resource, then the concurrency error may be detected.

In operation 104, responsive to detecting the concurrency error, the first update and the second update are merged to form a merged update. In an embodiment, the merging may be performed using a three-way merge algorithm. For example, the three-way merge algorithm may use a first content of the first update, a second content of the second update, and a base content to form the merged update.

In an embodiment, the base content may be a common version of the resource fetched by both the first source for requesting the first update and the second source for requesting the second update. The base content may be used for understanding what portion of the data each of the first update and the second update has modified. In an embodiment, the base content may be retrieved from storage, where for example the storage stores a defined number of past versions of the resource.

In operation 106, the merged update is saved to the resource. Saving the merged update to the resource may include writing the merged update to a storage location. In an embodiment, a version of the resource may also be updated (e.g. incremented) when the merged update is saved to the resource.

As an option, operation 106 may include determining whether the first update and the second update conflict with one another. In an embodiment, the first update and the second update may be determined to conflict with one another when the first update and the second update are configured to modify a same value (e.g. a same field) in the resource. With respect to this option, when the first update and the second update conflict with one another, it may be considered that the merge has failed and accordingly the merged update may not be saved to the resource. On the other hand, when the first update and the second update do not conflict with one another, it may be considered that the merge has succeeded and the merged update may be saved to the resource. To this end, the merged update may only be saved to the resource when it is determined that the first update and the second update do not conflict with one another.

To this end, the method 100, when performed, provides automatic content merging in an optimistic concurrency control mechanism. While typical optimistic concurrency control mechanisms will address concurrent updates by failing, and returning an error for, one of the updates, enabling automatic content merging in the case of concurrent updates may allow, in at least some cases, the concurrent updates from independent sources to be merged and saved to the resource. This automatic content merging feature may save computing resources by avoiding the re-processing of a failed update that would otherwise occur under typical optimistic concurrency control mechanisms.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
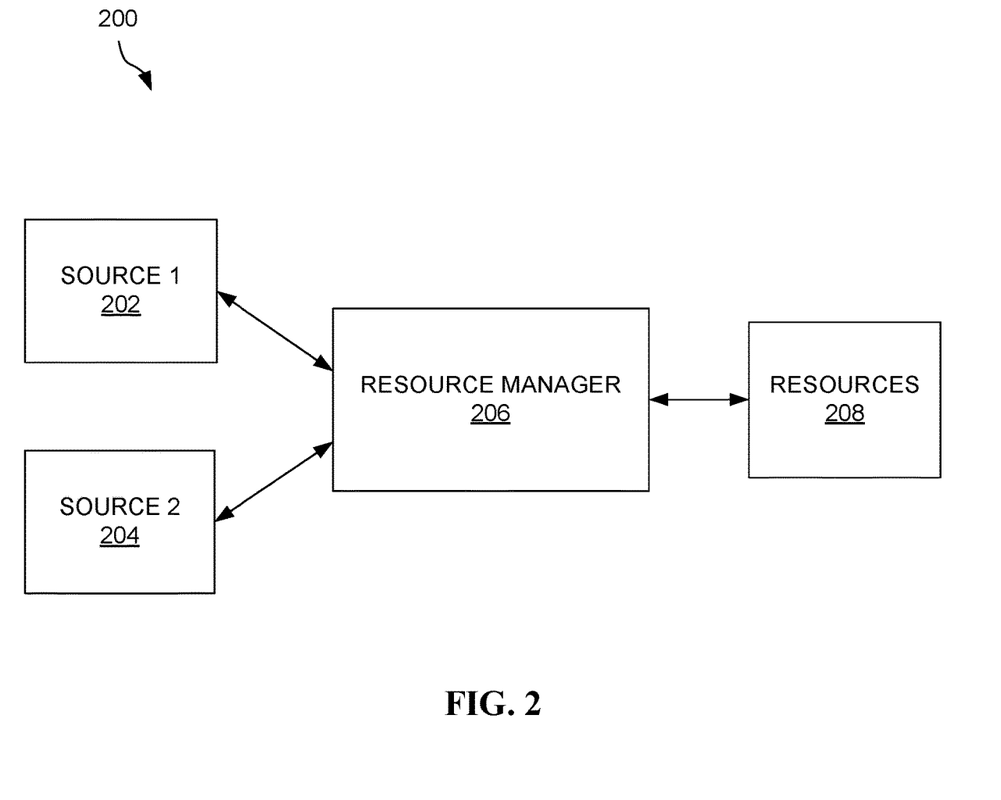
FIG. 2 illustrates a system using automatic content merging for an optimistic concurrency control mechanism, in accordance with one embodiment.

FIG. 2 illustrates a system 200 using automatic content merging for an optimistic concurrency control mechanism, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, a first source 202 and a second source 204 communicate with a resource manager 206. The first source 202 and the second source 204 are independent from one another and may be processes, threads, applications, etc. In an embodiment, the first source 202 and the second source 204 may execute in separate computer systems, or in another embodiment may execute in a same computer system. It should be noted that while only two sources are illustrates, the system 200 may include any number of additional sources to which the embodiments described herein may also apply.

The first source 202 and the second source 204 each communicate with the resource manager 206 via an application programming interface (API). The resource manager 206 is an application that manages updates to one or more resources 208 by the first source 202 and the second source 204. The resource manager 206 may execute on a server separate from the sources 202, 204, in an embodiment. The one or more resources 208 may each be any data capable of being updated by the first source 202 and the second source 204, such as a row in a table of a database, for example.

As mentioned, the resource manager 206 manages updates to the resource(s) 208 by the first source 202 and the second source 204. Managing updates includes receiving requests to update resources 208 from the sources 202, 204, fetching the resources 208 for the sources 202, 204 (i.e. reading the resources 208 and transmitting the read resources 208 to the sources 202, 204), receiving the updates from the sources 208, detecting concurrency errors resulting from updates concurrently made to a same resource 208, saving the updates to the resources 208 when no concurrency errors are detected, and merging the updates when a concurrency error is detected for saving the merged update to the resource 208.

Figure 3A:
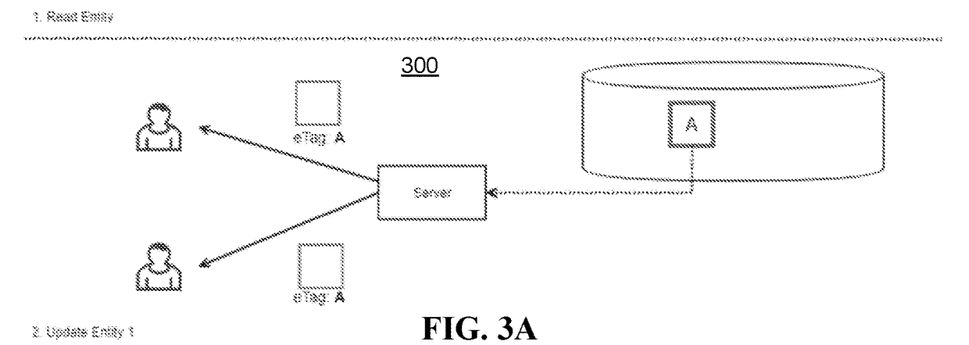
FIGS. 3A-C illustrate a flow diagram of a system in which a resource is concurrently fetched by two sources for updating and in which the updates are merged, in accordance with one embodiment.
Figure 3B:
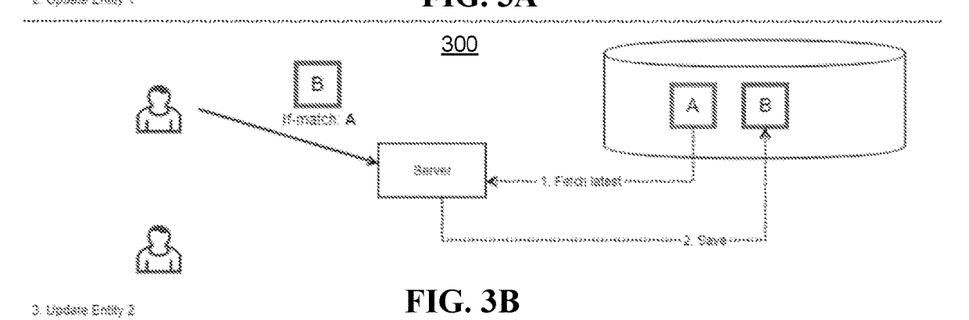
Figure 3C:
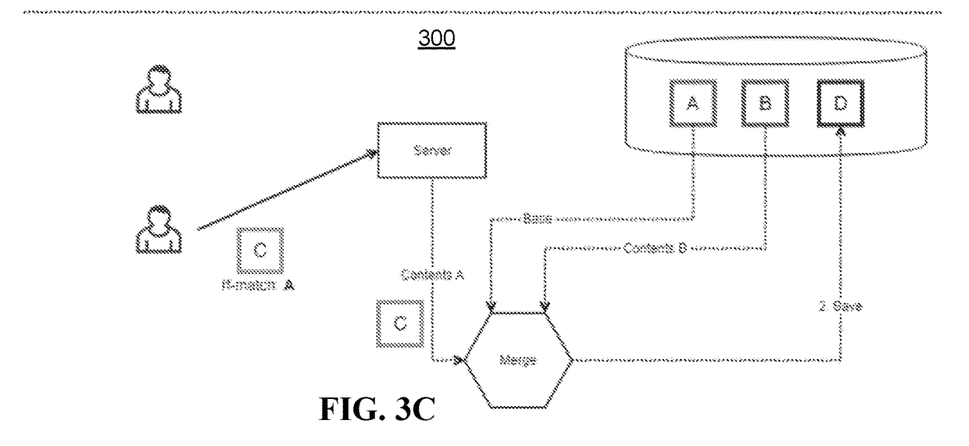

FIGS. 3A-C illustrate a flow diagram of a system 300 in which a resource is concurrently fetched by two sources for updating and in which the updates are merged, in accordance with one embodiment. As an option, the system 300 may be implemented in the context of the details of the previous figure and/or any subsequent figure(s). For example, the 300 may be implemented as the system 200 of FIG. 2 described above. Of course, however, the system 300 may be implemented in the context of any desired environment. Further, the aforementioned definitions may equally apply to the description below.

The flow illustrated for the present system 300 involves multiple sources (shows as API clients) trying to modify a same resource at roughly the same time (i.e. concurrently). Typically, each client will fetch the resource (using a fetch API), modify it in some way and save it (using a save API). If no precautions are taken, the second client to update the resource can end up overriding the changes made by the first client. For example:
1. Client A fetches resource/123: {"name": "iPhone", "price": 100, "inStock": true}
2. Client B fetches resource/123: {"name": "iPhone", "price": 100, "inStock": true}
3. Client A sends updates resource/123: {"name": "iPhone", "price": 200, "inStock": true}
4. Client B sends updates resource/123: {"name": "iPhone", "price": 100, "inStock": false}

Since both clients work independently from each other, client B ends up overriding client A's changes. An existing Optimistic Locking mechanism will prevent an update request from overriding previous changes. It works as follows:
1. The fetch API can include an Etag header in the response. The important thing about the Etag value is that every time the resource contents change, the Etag value will change as well.
2. When calling the update API (e.g. PUT) the client can pass the Etag value back to the service on a new request header called If-Match.
3. The server, when processing the update request, can compare the received Etag value against the current one. In case the values don't match, the update request will be rejected.

In this example using the standard Optimistic Locking mechanism, the second update would be rejected. Then the client could re-try the entire fetch-update cycle.

Rather than just rejecting such an update request, the embodiments described herein allow the server to automatically try to merge the changes from both clients. That way, the second update attempt won't fail while also guaranteeing that no updates are lost.

In the example above, after Client B sends {"name": "iPhone", "price": 100, "inStock": false}, we would expect the resource to end up with the following contents: {"name": "iPhone", "price": 200, "inStock": false}

Upon receiving an update request containing an Etag value (in the If-Match) header, the server will check if the value matches the current one. In case it doesn't, then the server will try to merge the contents using a standard three-way merge algorithm.

The input to the three way algorithm is:
1. Base contents
2. Contents A
3. Contents B The algorithm attempts to merge Contents A and Contents B. Base contents is a common ancestor for both Contents A and Contents B, which is used for understanding what data each Content has modified.

Example 1

Base contents: {"name": "iPhone", "price": 100, "inStock": true}
Contents A: {"name": "iPhone", "price": 200, "inStock": true}
Contents B: {"name": "iPhone", "price": 100, "inStock": false}
Merged Contents: {"name": "iPhone", "price": 200, "inStock": false}

Example 2

Base contents: {"name": "iPhone", "price": 100, "inStock": true}
Contents A: {"name": "iPhone", "price": 200, "inStock": true}
Contents B: {"name": "iPhone", "price": 300, "inStock": true}
Merged Contents: CONFLICT. Both contents have changed the same field.

Without having the Base Contents for reference, the algorithm wouldn't be able to detect conflicts or merge both contents properly.

Enhancements to API Server

Etag Value

Every time a resource is modified, the server will store an immutable copy of the record (a version). This record will have its own unique identifier (id) (e.g. an incremental id, a UUID, etc.). When serving the fetch resource API request, the returned Etag value will be the id of the current/latest version.

Example: if a resource has been updated 4 times, the server will have stored 4 different versions of the record:
id=1, contents={"name": "iPhone", "price": 100, "inStock": true}
id=2, contents={"name": "iPhone", "price": 200, "inStock": true}
id=3, contents={"name": "iPhone", "price": 200, "inStock": false}
id=4, contents={"name": "iPhone", "price": 300, "inStock": false}

The current Etag value for the resource would be 4.

Storing past versions is needed so that they can be used later on as the Base Contents for the three way merge algorithm. Past revisions don't need to be kept forever. One can decide to keep only the latest N revisions or, alternatively, rely on a policy where past revisions expire after a few minutes. We don't expect a client to fetch a resource and wait several minutes before updating it. Hence it's not likely that very old versions will be needed.

Update Processing (by Server)
Input:
contents
eTag (in If-Match header)
1. Compare Etag values
if (input.eTag==current eTag)→go ahead with save as usual
else→move on to next step (2)
2. Try to merge contents
Execute three way merge algorithm with following input:
Base contents=fetch resource version from database with id=input.Etag (if version doesn't exist→reject save and return error)
Contents A=input.content
Contents B=current contents (from database)
if merge succeed→save merged contents
if merge fails (conflicts, etc. . . . )→reject save and return error.

Example

1. Current resource/123: {"name": "iPhone", "price": 100, "inStock": true}, eTag=1

2. Client A fetches resource/123: {"name": "iPhone", "price": 100, "inStock": true}, eTag=1
3. Client B fetches resource/123: {"name": "iPhone", "price": 100, "inStock": true}, eTag=1
4. Client A sends updates resource/123: {"name": "iPhone", "price": 200, "inStock": true}, If-Match=1
5. Current resource/123: {"name": "iPhone", "price": 200, "inStock": true}, eTag=2
6. Client B sends updates resource/123: {"name": "iPhone", "price": 100, "inStock": false}, If-Match=1
7. Current resource/123: {"name": "iPhone", "price": 200, "inStock": false}, eTag=3

To this end, while existing Optimistic Locking is only meant to prevent updates that might override previous changes, the automatic merge described herein can not only detect when updates might be lost, but also automatically merge changes in order to avoid unnecessary failures.

Figure 4:
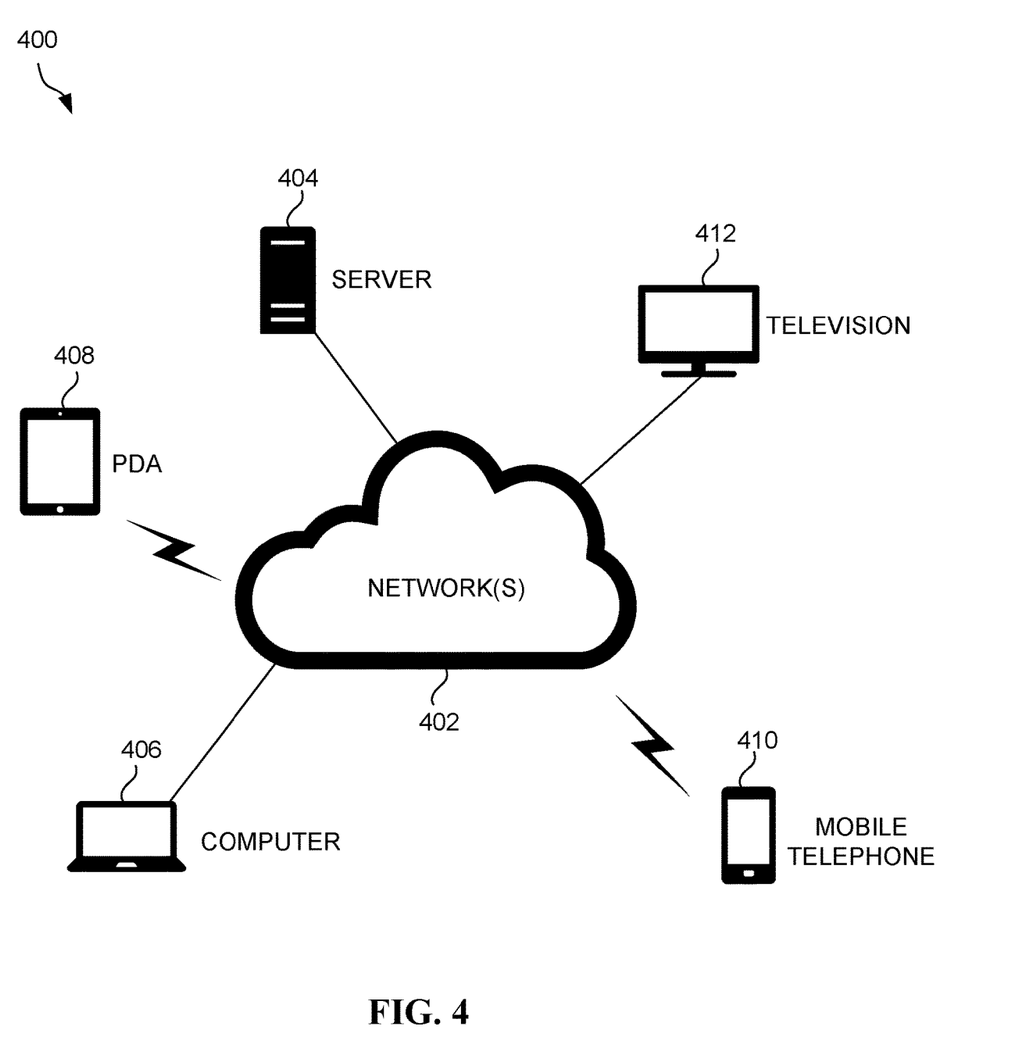
FIG. 4 illustrates a network architecture, in accordance with one possible embodiment.
Figure 5:
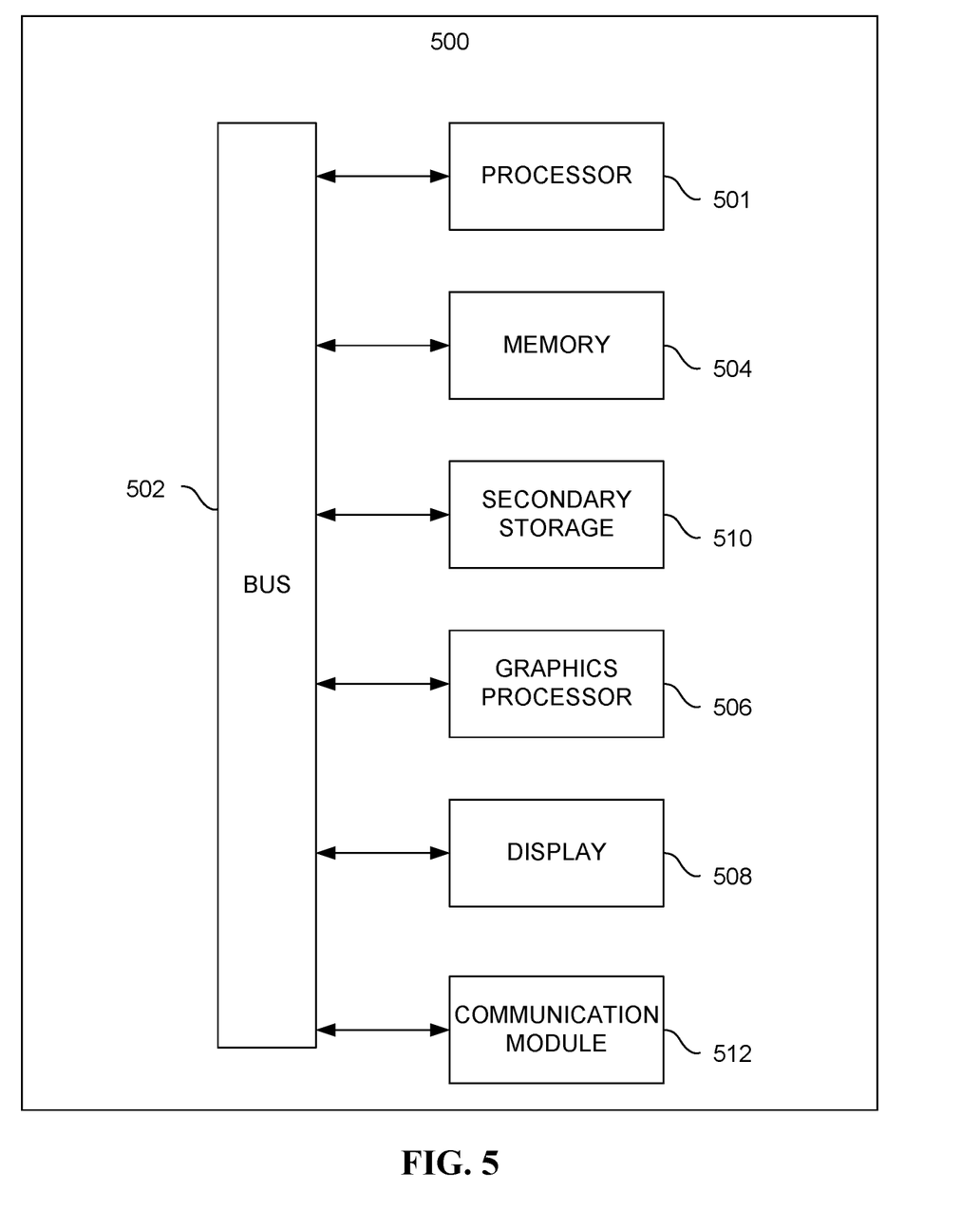
FIG. 5 illustrates an exemplary system, in accordance with one embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
   fetch, by a first source, the initial version of a resource from a memory for updating;
   fetch, by a second source, the initial version of the resource from the memory for updating;
   perform, by the first source, a first update on the initial version of the resource in the memory to a form a new version of the resource in the memory, wherein the first update by the first source is performed after the second source fetches the initial version of the resource from the memory and before the second source performs a second update on the initial version of the resource in the memory;
   store the new version of the resource in the memory with an indicator of the new version along with the initial version of the resource being stored in the memory with the indicator of the initial version;
   request, by the second source, to perform the second update on the initial version of the resource in the memory;
   detect a concurrency error by determining that the second update requested by the second source references the initial version of the resource which does not match the new version indicated in the memory for the new version of the resource stored in the memory;
   responsive to detecting the concurrency error and that the first update and the second update do not modify a same field of the initial version of the resource, merge the first update and the second update to form a merged update, wherein the merge is a three-way merge that uses use a first content of the first update, a second content of the second update, and a base content of the initial version of the resource to form the merged update; and
   overwrite the new version of the resource stored in the memory with the merged update applied to the initial version of the resource in the memory.

2. The non-transitory computer-readable media of claim 1, wherein the base content is used for understanding what portion of the data each of the first update and the second update modifies.

3. The non-transitory computer-readable media of claim 1, wherein the base content is retrieved from storage.

4. The non-transitory computer-readable media of claim 3, wherein the storage stores a defined number of past versions of the resource.

5. A method, comprising:
   at a computer system:
   fetching, by a first source, the initial version of a resource from a memory for updating;
   fetching, by a second source, the initial version of the resource from the memory for updating;
   performing, by the first source, a first update on the initial version of the resource in the memory to a form a new version of the resource in the memory, wherein the first update by the first source is performed after the second source fetches the initial version of the resource from the memory and before the second source performs a second update on the initial version of the resource in the memory;
   storing the new version of the resource in the memory with an indicator of the new version along with the initial version of the resource being stored in the memory with the indicator of the initial version;
   requesting, by the second source, to perform the second update on the initial version of the resource in the memory;
   detecting a concurrency error by determining that the second update requested by the second source references the initial version of the resource which does not match the new version indicated in the memory for the new version of the resource stored in the memory;

responsive to detecting the concurrency error and that the first update and the second update do not modify a same field of the initial version of the resource, merging the first update and the second update to form a merged update, wherein the merge is a three-way merge that uses use a first content of the first update, a second content of the second update, and a base content of the initial version of the resource to form the merged update; and overwriting the new version of the resource stored in the memory with the merged update applied to the initial version of the resource in the memory.

6. A system, comprising:

a non-transitory memory storing instructions; and one or more processors in communication with the non-transitory memory that execute the instructions to:

fetch, by a first source, the initial version of a resource from a memory for updating;

fetch, by a second source, the initial version of the resource from the memory for updating;

perform, by the first source, a first update on the initial version of the resource in the memory to a form a new version of the resource in the memory, wherein the first update by the first source is performed after the second source fetches the initial version of the resource from the memory and before the second source performs a second update on the initial version of the resource in the memory;

store the new version of the resource in the memory with an indicator of the new version along with the initial version of the resource being stored in the memory with the indicator of the initial version;

request, by the second source, to perform the second update on the initial version of the resource in the memory;

detect a concurrency error by determining that the second update requested by the second source references the initial version of the resource which does not match the new version indicated in the memory for the new version of the resource stored in the memory;

responsive to detecting the concurrency error and that the first update and the second update do not modify a same field of the initial version of the resource, merge the first update and the second update to form a merged update, wherein the merge is a three-way merge that uses use a first content of the first update, a second content of the second update, and a base content of the initial version of the resource to form the merged update; and overwrite the new version of the resource stored in the memory with the merged update applied to the initial version of the resource in the memory.

\* \* \* \* \*